United States Patent
Jang et al.

(10) Patent No.: US 11,747,706 B2
(45) Date of Patent: Sep. 5, 2023

(54) OPTICAL DISPLAY DEVICE HAVING VARIABLE CONDUCTIVITY PATTERNS

(71) Applicant: Korea Advanced Institute of Science and Technology, Daejeon (KR)

(72) Inventors: Min Seok Jang, Daejeon (KR); Sangjun Han, Daejeon (KR); Shinho Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 301 days.

(21) Appl. No.: 16/686,478

(22) Filed: Nov. 18, 2019

(65) Prior Publication Data
US 2020/0341346 A1    Oct. 29, 2020

(30) Foreign Application Priority Data

Apr. 24, 2019   (KR) .......................... 10-2019-0047778

(51) Int. Cl.
*G02F 1/29*    (2006.01)
(52) U.S. Cl.
CPC .......... *G02F 1/29* (2013.01); *G02F 2201/122* (2013.01); *G02F 2203/24* (2013.01)

(58) Field of Classification Search
CPC combination set(s) only.
See application file for complete search history.

(56) References Cited

U.S. PATENT DOCUMENTS

2011/0134348 A1* 6/2011 Morishita ............. G02F 1/1393
                                                                349/33
2011/0199568 A1* 8/2011 Morishita ......... G02F 1/134363
                                                                349/141

* cited by examiner

*Primary Examiner* — Lauren Nguyen
(74) *Attorney, Agent, or Firm* — CHRISTENSEN O'CONNOR JOHNSON KINDNESS PLLC

(57) ABSTRACT

Provided are an optical device and a method of manufacturing the optical device including a lower electrode; an insulating layer provided on the lower electrode; upper electrodes provided on the insulating layer; and variable conductivity patterns provided to be adjacent to the upper electrodes, respectively, on the insulating layer. The upper electrodes include first and second electrodes that are alternately provided, a pitch between the first electrodes is identical to a pitch between the second electrodes, the second electrode is provided between the adjacent first electrodes, a distance between one of the adjacent first electrodes and the second electrode is a first length, a distance between another one of the adjacent first electrodes and the second electrode is a second length, and the second length differs from the first length.

12 Claims, 13 Drawing Sheets

OPTICAL DISPLAY DEVICE HAVING VARIABLE CONDUCTIVITY PATTERNS

CROSS-REFERENCE TO RELATED APPLICATION

This application claims the priority benefit of Korean Patent Application No. 10-2019-0047778, filed on Apr. 24, 2019, in the Korean Intellectual Property Office, the disclosure of which is incorporated herein by reference.

BACKGROUND

1. Field of the Invention

The following description of example embodiments relates to an optical device and a method of manufacturing the optical device and, more particularly, to a light modulator and a method of manufacturing the light modulator.

2. Description of the Related Art

An optical device for changing a transmission/reflection, polarization, phase, intensity, path, etc., of incident light is used for various types of optical devices. Also, light modulators in various structures are proposed to control the aforementioned features in a desired manner within an optical system.

A wavefront modulator according to the related art uses liquid crystal or a small mirror with a size of a micro unit. A modulator using liquid crystal operates by applying an electrical or thermal signal. A modulator using liquid crystal adjusts a reaction to incident light using an attribute that an alignment direction of liquid crystal is determined based on a signal. A modulator, for example, digital mirror devices (DMDs), using a small mirror operates using a principle of reflecting incident light in a desired direction by adjusting a direction of each of micro mirrors.

A metasurface refers to an optical material with a thin thickness that changes a characteristic of incident light. The metasurface may exhibit an enhanced modulation performance over the related arts using liquid crystal or a mirror, and also may reduce a size of a corresponding element to be dozens of times smaller than a wavelength. Also, since reflected light or transmitted light in a desired type is obtainable by appropriately designing the metasurface, research on the metasurface is actively ongoing as key technology, such as, for example, a flat lens, an ultra-compact holography, a lidar, and a cloaking.

Graphene has excellent characteristics as a material that constitutes the metasurface. Initially, a characteristic of graphene varies in response to an applied voltage. If the metasurface is configured using graphene, a level of modulation is adjustable by applying an electrical gating. Since this method is a method of adjusting fermi energy of graphene, a relatively fast modulation speed may be obtained over an existing method using liquid crystal. Further, graphene plasmons are hundreds of times smaller than photons in free space, which is a key characteristic that leads to the miniaturization of the metasurface.

SUMMARY

Example embodiments provide an optical device with an enhanced optical characteristic.

Example embodiments also provide a method of manufacturing an optical device with an enhanced optical characteristic.

According to an aspect of example embodiments, there is provided an optical device including a lower electrode; an insulating layer provided on the lower electrode; upper electrodes provided on the insulating layer; and variable conductivity patterns provided to be adjacent to the upper electrodes, respectively, on the insulating layer. The upper electrodes include first and second electrodes that are alternately provided, a pitch between the first electrodes is identical to a pitch between the second electrodes, the second electrode is provided between the adjacent first electrodes, a distance between one of the adjacent first electrodes and the second electrode is a first length, a distance between another one of the adjacent first electrodes and the second electrode is a second length, and the second length differs from the first length.

According to another aspect of example embodiments, there is provided an optical device including a lower electrode; an insulating layer provided on the lower electrode; upper electrodes provided on the insulating layer; and variable conductivity patterns provided to be adjacent to the upper electrodes, respectively, on the insulating layer. The upper electrodes include first and second electrodes that are alternately provided, the variable conductivity patterns include first and second variable conductivity patterns that are provided to be adjacent to the first and second electrodes, respectively, the first and second electrodes have an identical first width, each of the first variable conductivity patterns has a second width, and each of the second variable conductivity patterns has a third width different from the second width.

According to another aspect of example embodiments, there is provided an optical device including a lower electrode; an insulating layer provided on the lower electrode; upper electrodes provided on the insulating layer; and variable conductivity patterns provided to be adjacent to the upper electrodes, respectively, on the insulating layer. The upper electrodes include first and second electrodes that are alternately provided, the variable conductivity patterns include first and second variable conductivity patterns that are provided to be adjacent to the first and second electrodes, respectively, the first and second electrodes adjacent to each other are separate at a first length based on the first variable conductivity pattern, the first and second electrodes adjacent to each other are separate at a second length based on the second variable conductivity pattern, and the second length differs from the first length.

An optical device according to some example embodiments may adjust a phase of mid-infrared reflected wave while maintaining an amplitude of the mid-infrared reflected wave or may adjust the amplitude of the mid-infrared wave while maintaining the phase of the mid-infrared reflected wave. That is, when the mid-infrared ray is incident to a light modulator according to example embodiments, the optical device may independently adjust the amplitude and the phase of reflected wave. As described above, the optical device may freely adjust the wavefront of the mid-infrared ray. The optical device may apply to a lens, a beam steering element for lidar, an ultra wideband remote distance communication, an active heat radiation control, and the like.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments.

When a component is described to be on another component, the component may be directly formed on the other component or a third component may be provided between the components. Also, in the drawings, thicknesses of components may be exaggerated to effectively describe technical content. Unless otherwise noted, like reference numerals refer to like components throughout the attached drawings and written description, and thus descriptions will not be repeated.

The example embodiments described herein will be described with the accompanying drawings. In the drawings, thicknesses of layers, regions, etc., may be exaggerated for effective description of the technical content. Accordingly, regions illustrated in the drawings may have general attributes and shapes of the regions are merely provided as examples and not construed to limit the scope of the disclosure. Terms "first", "second", "third", etc., are used to describe various components and the components should not be limited by the terms. The terms are simply used to distinguish one component from another component. The examples described herein include their complimentary example embodiments.

The example embodiments and the terms used herein are not construed to limit the disclosure to specific example embodiments and may be understood to include various modifications, equivalents, and/or substitutions. As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof.

Figure 1:
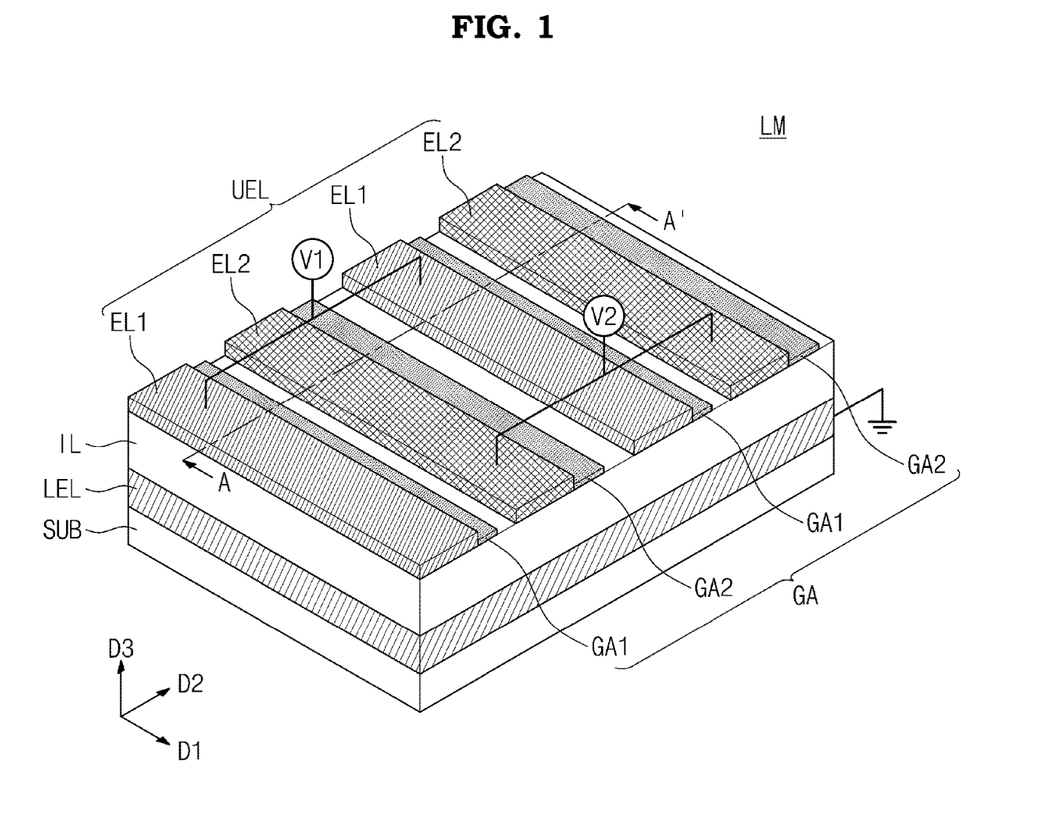
FIG. 1 is a perspective view illustrating an optical device according to example embodiments.
Figure 2:
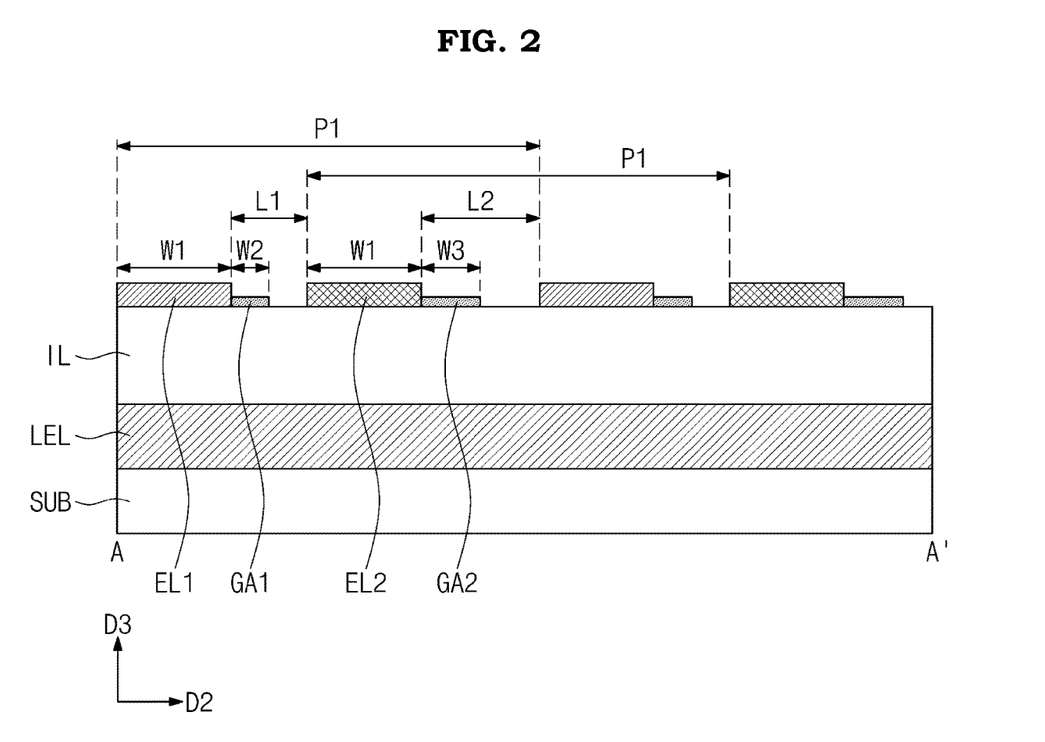
FIG. 2 is a cross-sectional view of the optical device cut along a line A-A' of FIG. 1.

FIG. 1 is a perspective view illustrating an optical device according to example embodiments, and FIG. 2 is a cross-sectional view of the optical device cut along line A-A' of FIG. 1.

Referring to FIGS. 1 and 2, an optical device according to example embodiments may include a light modulator LM. The light modulator LM may include a substrate SUB, a lower electrode LEL, an insulating layer IL, upper electrodes UEL, and variable conductivity patterns GA. The substrate SUB may include a semiconductor substrate, such as, for example, a silicone substrate.

The lower electrode LEL may be provided on the substrate SUB. The lower electrode LEL may be in a shape of a flat plate. The lower electrode LEL may include at least one of a metal material, such as, for example, titanium, tantalum, tungsten, gold, silver, copper, and aluminum, and conductive metal nitride, such as, for example, titanium nitride and tantalum nitride. Ground voltage may be applied to the lower electrode LEL. Although not illustrated, an additional layer, for example, the insulating layer IL, may be provided between the substrate SUB and the lower electrode LEL.

The insulating layer IL may be provided on the lower electrode LEL. The insulating layer IL may include a silicon oxide layer, a silicon nitride layer, or a silicon oxynitride layer. For example, a thickness of the insulating layer IL may be greater than a thickness of the lower electrode LEL.

The upper electrodes UEL may be provided on the insulating layer IL. The upper electrodes UEL may include first electrodes EL1 and second electrodes EL2. The upper electrodes UEL, for example, the first and second electrodes EL1 and EL2, may include at least one of a metal material, such as, for example, titanium, tantalum, gold, silver, copper, and aluminum, and a conductive metal material, such as, for example, titanium nitride or tantalum nitride. The first and second electrodes EL1 and EL2 may include the same conductive material.

The first and second electrodes EL1 and EL2 may extend in a first direction D1 to be in parallel to each other. In a plane view, the first and second electrodes EL1 and EL2 may be in a shape of a line or a bar. The first and second electrodes EL1 and EL2 may be alternately provided in a second direction D2. That is, the second electrode EL2 may be provided between the adjacent first electrodes EL1 The first electrode EL1 may be provided between the adjacent second electrodes EL2. A third direction D3 may indicate a direction corresponding to z-axis. In other words, the third direction D3 may indicate a direction in which the substrate SUB, the lower electrode LEL and the insulating layer IL is stacked.

Each of the first electrodes EL1 may have a first width W1. Each of the second electrodes EL2 may have the first width W1. That is, the first and second electrodes EL1 and EL2 may have the substantially identical width. According to another example embodiment, a width of each of the first electrodes EL1 may differ from a width of each corresponding second electrodes EL2 and may not be particularly limited to the example of FIG. 2.

A pitch between the first electrodes EL1 may be a first pitch P1. Also, a pitch between the second electrodes EL2 may be the first pitch P1. That is, the first electrodes EL1 may be aligned at intervals of the first pitch P1. Also, the second electrodes EL2 may be aligned at intervals of the first pitch P1.

A distance between the first electrode EL1 and a second electrode EL2 adjacent thereto in the second direction D2 may be a first length L1. A distance between the second electrode EL2 and the first electrode EL1 adjacent thereto in the second direction D2 may be a second length L2. The second length L2 may be greater than the first length L1.

The second electrode EL2 between the adjacent first electrodes EL1 may be provided to be offset at a center point between the adjacent first electrodes EL1. A distance between one of the adjacent first electrodes EL1 and the second electrode EL2 may be the first length L1 and a distance between another one of the adjacent first electrodes EL1 and the second electrode EL2 may be the second length L2.

A first voltage V1 may be commonly applied to the first electrodes EL1. A second voltage V2 may be commonly applied to the second electrodes EL2. The second voltage V2 may differ from the first voltage V1.

The variable conductivity patterns GA may be provided on the insulating layer IL. The variable conductivity patterns GA may include first variable conductivity patterns GA1 and second variable conductivity patterns GA2.

The first and second variable conductivity patterns GA1 and GA2 may extend to be in parallel to each other in the first direction D1. In a plane view, the first and second variable conductivity patterns GA1 and GA2 may be in a shape of a line or a bar. The first and second variable conductivity patterns GA1 and GA2 may be alternately aligned in the second direction D2.

The first variable conductivity patterns GA1 may be provided to be adjacent to sidewalls of the first electrodes EL1, respectively. The second variable conductivity patterns GA2 may be provided to be adjacent to sidewalls of the second electrodes EL2, respectively. The first variable conductivity pattern GA1 may be in contact with the first electrode EL1 adjacent thereto. That is, the first variable conductivity pattern GA1 may be electrically connected to the first electrode EL1 adjacent thereto. The second variable conductivity pattern GA2 may be in contact with the second electrode EL2 adjacent thereto. That is, the second variable conductivity pattern GA2 may be electrically connected to the second electrode EL2 adjacent thereto.

Each of the first variable conductivity patterns GA1 may have a second width W2. Each of the second variable conductivity patterns GA2 may have a third width W3. The third width W3 may be greater than the second width W2. For example, the second width W2 may be a half of the first length L1 and the third width W3 may be a half of the second length L2.

The conductivity of the variable conductivity patterns GA may vary in response to a voltage applied to the upper electrodes UEL. For example, the variable conductivity patterns GA may include graphene, indium tin oxide (ITO), or black phosphorus. Desirably, the variable conductivity patterns GA may include a two-dimensional (2D) material in a monolayer structure.

Graphene may have a monolayer structure or a multilayer structure in which two to ten layers are stacked. Each of the variable conductivity patterns GA including graphene may have a 2D structure. For example, the variable conductivity patterns GA including graphene may configure the metasurface using graphene plasmons.

The optical device according to example embodiments may apply the first voltage V1 to the first electrodes EL1 and may apply the second voltage V2 to the second electrodes EL2. Accordingly, fermi energy provided to the first variable conductivity patterns GA1 coupled to the first electrodes EL1 may differ from fermi energy provided to the second variable conductivity patterns GA2 coupled to the second electrodes EL2. For example, if the variable conductivity patterns GA include graphene, light may be modulated by adjusting the fermi energy of graphene.

The optical device may be designed such that the first and second electrodes EL1 and EL2 are alternately provided and two resonance characteristics are mutually complemented accordingly. The optical device may adjust a phase of mid-infrared reflected wave while maintaining amplitude of the mid-infrared reflected wave or may adjust the amplitude of the mid-infrared reflected wave while maintaining the phase of the mid-infrared reflected wave by appropriately combining the first voltage V1 and the second voltage V2. That is, when a mid-infrared ray is incident to the light modulator LM, the optical device may independently adjust the amplitude and the phase of reflected wave by adjusting the first voltage V1 and the second voltage V2.

As described above, the optical device according to example embodiments may freely adjust the wavefront of the mid-infrared ray. Therefore, the optical device may apply to a lens, a beam steering element for lidar, an ultra wideband remote distance communication, an active heat radiation control, and the like.

Figure 3:
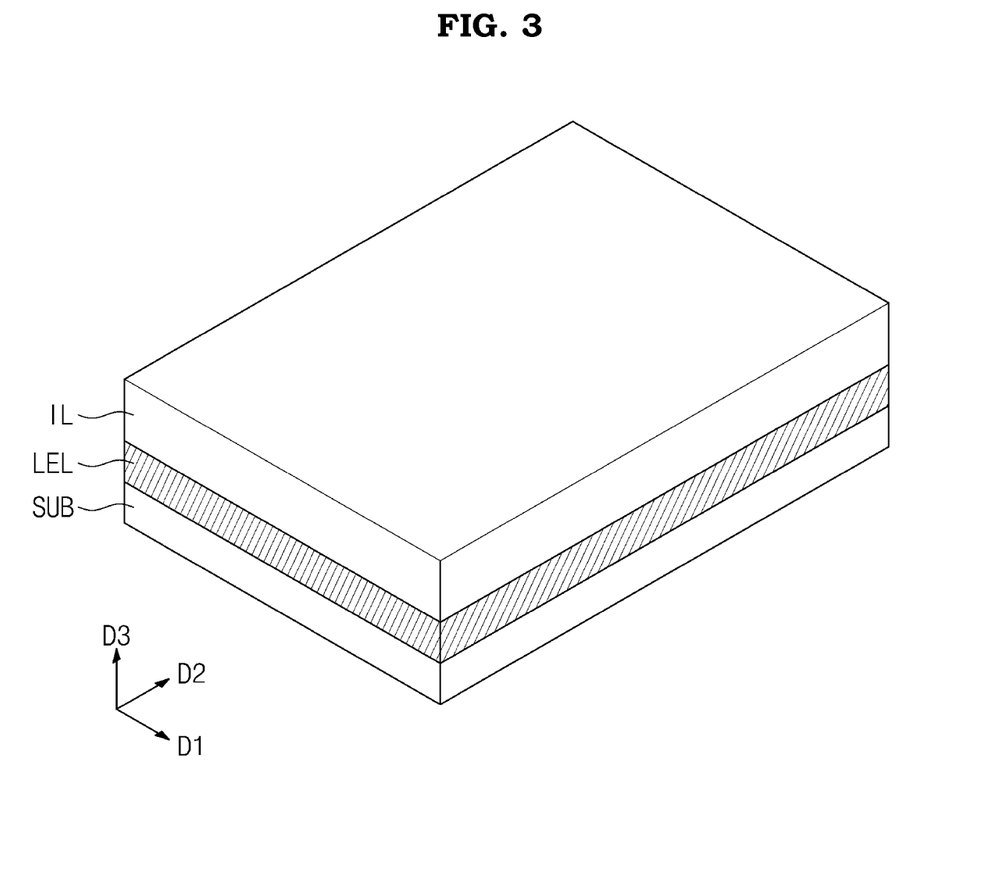
FIGS. 3, 4, and 5 are perspective views illustrating a method of manufacturing an optical device according to example embodiments.
Figure 4:
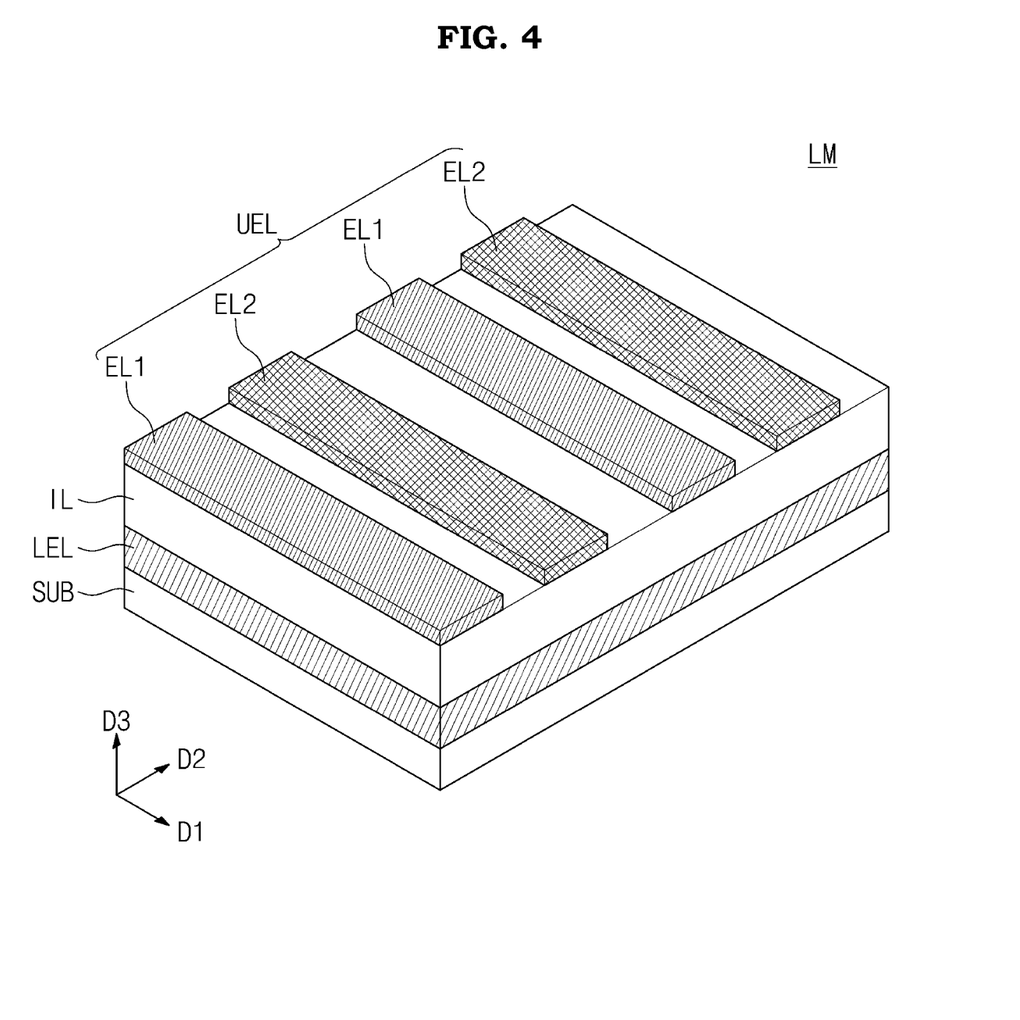
Figure 5:
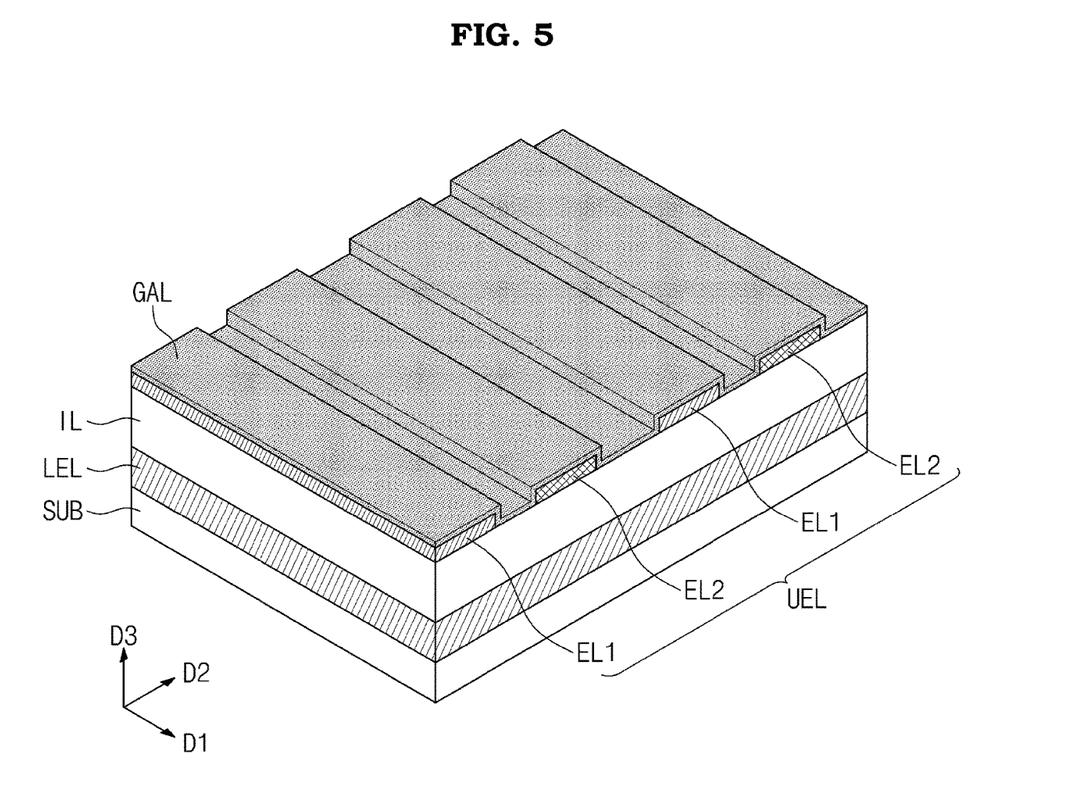

FIGS. 3, 4, and 5 are perspective views illustrating a method of manufacturing an optical device according to example embodiments.

Referring to FIG. 3, the lower electrode LEL may be formed on the substrate SUB. The lower electrode LEL may include at least one of a metal material and a conductive metal nitride. The lower electrode LEL may be formed using a deposition process or a plating process.

The insulating layer IL may be formed on the lower electrode LEL. The insulating layer IL may include a silicon oxide layer, a silicon nitride layer, or a silicon oxynitride layer.

Referring to FIG. 4, the upper electrodes UEL may be formed on the insulating layer IL. The upper electrodes UEL may include the first electrodes EL1 and the second electrodes EL2 that are alternately provided, that is, aligned.

For example, forming the upper electrodes UEL may include forming an electrode layer on the insulating layer IL and forming the first and second electrodes EL1 and EL2 by patterning the electrode layer. As another example, forming the upper electrodes UEL may include directly forming the first and second electrodes EL1 and EL2 on the insulating layer IL using a mask. The first and second electrodes EL1 and EL2 may be simultaneously formed. Alternatively, the first electrodes EL1 may be initially formed and the second electrodes EL2 may be subsequently formed.

Referring to FIG. 5, the variable conductivity layer GAL may be formed on the upper electrodes UEL. For example, forming the variable conductivity layer GAL may include performing a deposition process on the whole surface of the substrate SUB. As another example, forming the variable conductivity layer GAL may include transferring the variable conductivity layer GAL on the upper electrodes UEL.

Referring again to FIGS. 1 and 2, the variable conductivity patterns GA may be formed by patterning the variable conductivity layer GAL. The variable conductivity patterns GA may include the first and second variable conductivity patterns GA1 and GA2. The first and second variable conductivity patterns GA1 and GA2 may be formed to be adjacent to sidewalls of the first and second electrodes EL1 and EL2, respectively.

Figure 6:
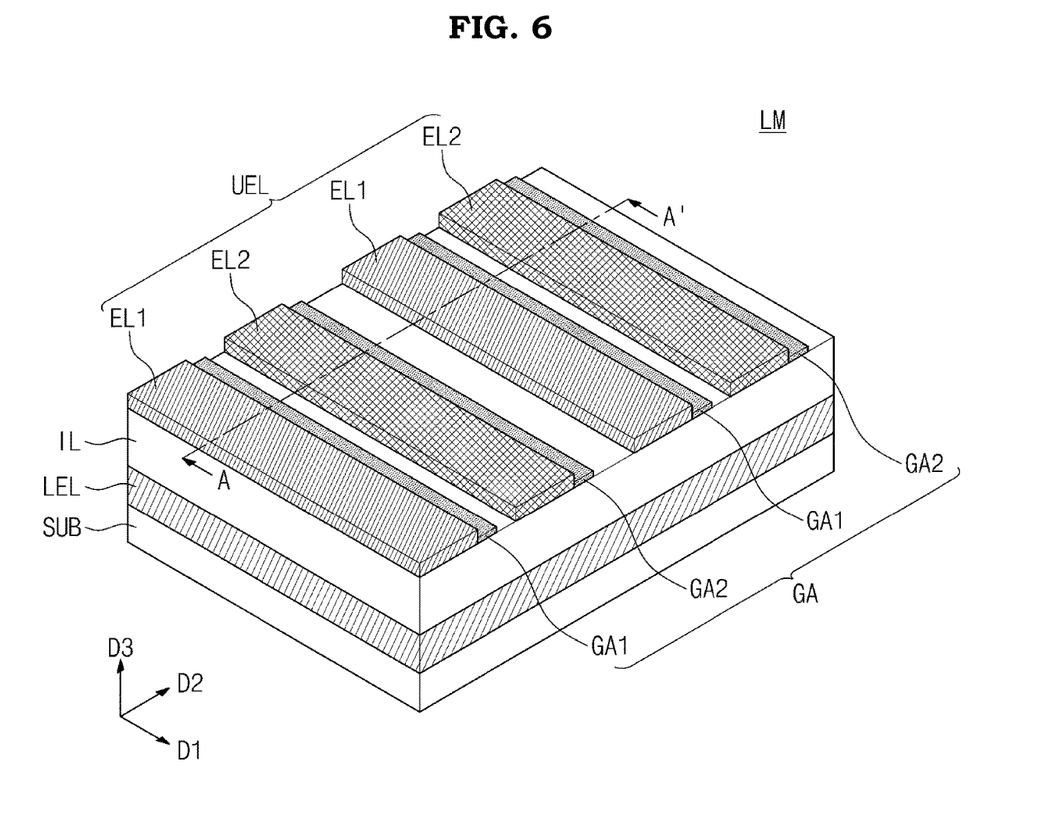
FIG. 6 is a perspective view illustrating an optical device according to example embodiments.
Figure 7:
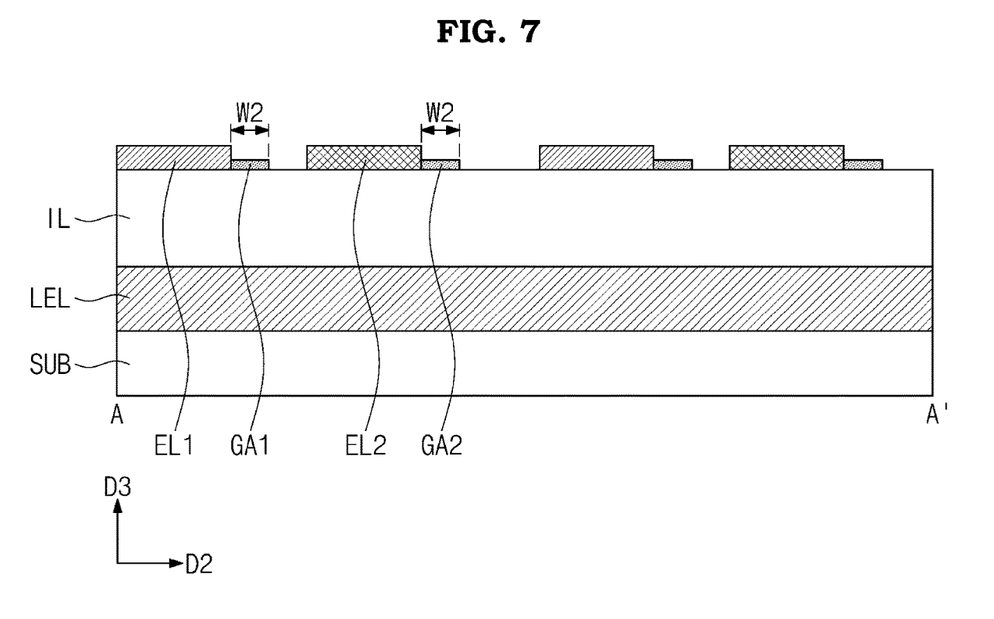
FIG. 7 is a cross-sectional view of the optical device cut along a line A-A' of FIG. 6.

FIG. 6 is a perspective view illustrating an optical device according to example embodiments, and FIG. 7 is a cross-sectional view of the optical device cut along a line A-A' of FIG. 6. Herein, further description related to technical features of the optical device described above with reference to FIGS. 1 and 2 is omitted and description is made based on a difference.

Referring to FIGS. 6 and 7, first and second variable conductivity patterns GA1 and GA2 may have a substantially identical width. For example, each of the first variable conductivity patterns GA1 may have a second width W2 and each of the second variable conductivity patterns GA2 may have the second width W2.

Figure 8:
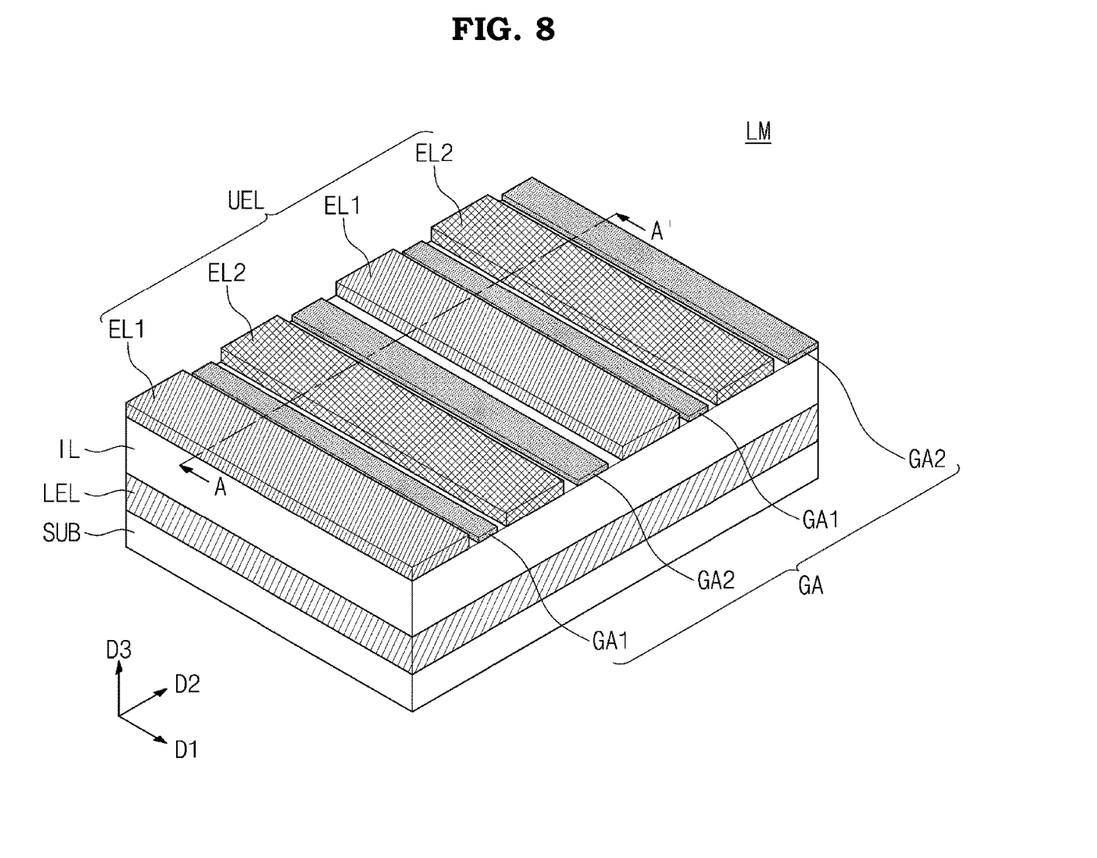
FIG. 8 is a perspective view illustrating an optical device according to example embodiments.
Figure 9:
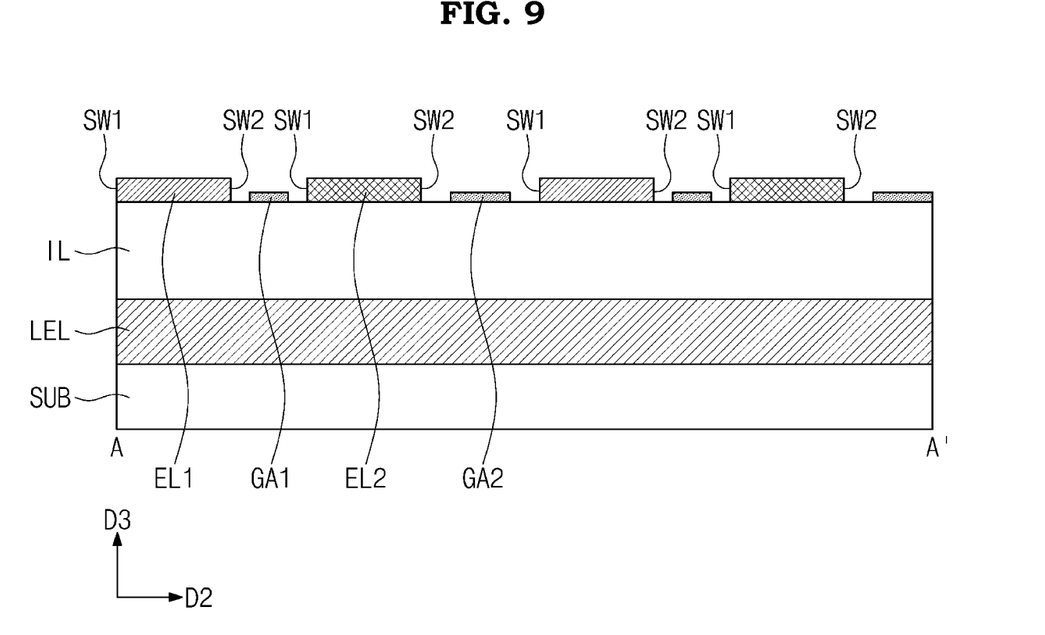
FIG. 9 is a cross-sectional view of the optical device cut along a line A-A' of FIG. 8.

FIG. 8 is a perspective view illustrating an optical device according to example embodiments, and FIG. 9 is a is a cross-sectional view of the optical device cut along a line A-A' of FIG. 8. Herein, further description related to technical features of the optical device described above with reference to FIGS. 1 and 2 is omitted and description is made based on a difference.

Referring to FIGS. 8 and 9, each of first electrodes EL1 may have a first sidewall SW1 and a second sidewall SW2 that faces the first sidewall SW1. The second sidewall SW2 may be separate from the first sidewall SW1 in a second direction D2. Each of second electrodes EL2 may have a first sidewall SW1 and a second sidewall SW2 that faces the first sidewall SW1.

Each of first variable conductivity patterns GA1 may be provided between the first electrode EL1 and the second electrode EL2 adjacent to the first electrode EL1 in the second direction D2. That is, the first variable conductivity pattern GA1 may be provided between the second sidewall SW2 of the first electrode EL1 and the first sidewall SW1 of the second electrode EL2. The first variable conductivity pattern GA1 may be separate from the second sidewall SW2 of the first electrode EL1 and also may be separate from the first sidewall SW1 of the second electrode EL2. That is, the first variable conductivity patterns GA1 may be separate from the first and second electrodes EL1 and EL2.

Each of second variable conductivity patterns GA2 may be provided between the second electrode EL2 and the first electrode EL1 adjacent to the second electrode EL2 in the second direction D2. That is, the second variable conductivity pattern GA2 may be provided between the second sidewall SW2 of the second electrode EL2 and the first sidewall SW1 of the first electrode EL1. The second variable conductivity pattern GA2 may be separate from the second sidewall SW2 of the second electrode EL2 and also may be separate from the first sidewall SW1 of the first electrode EL1. That is, the second variable conductivity patterns GA2 may be separate from the first and second electrodes EL1 and EL2.

Figure 10:
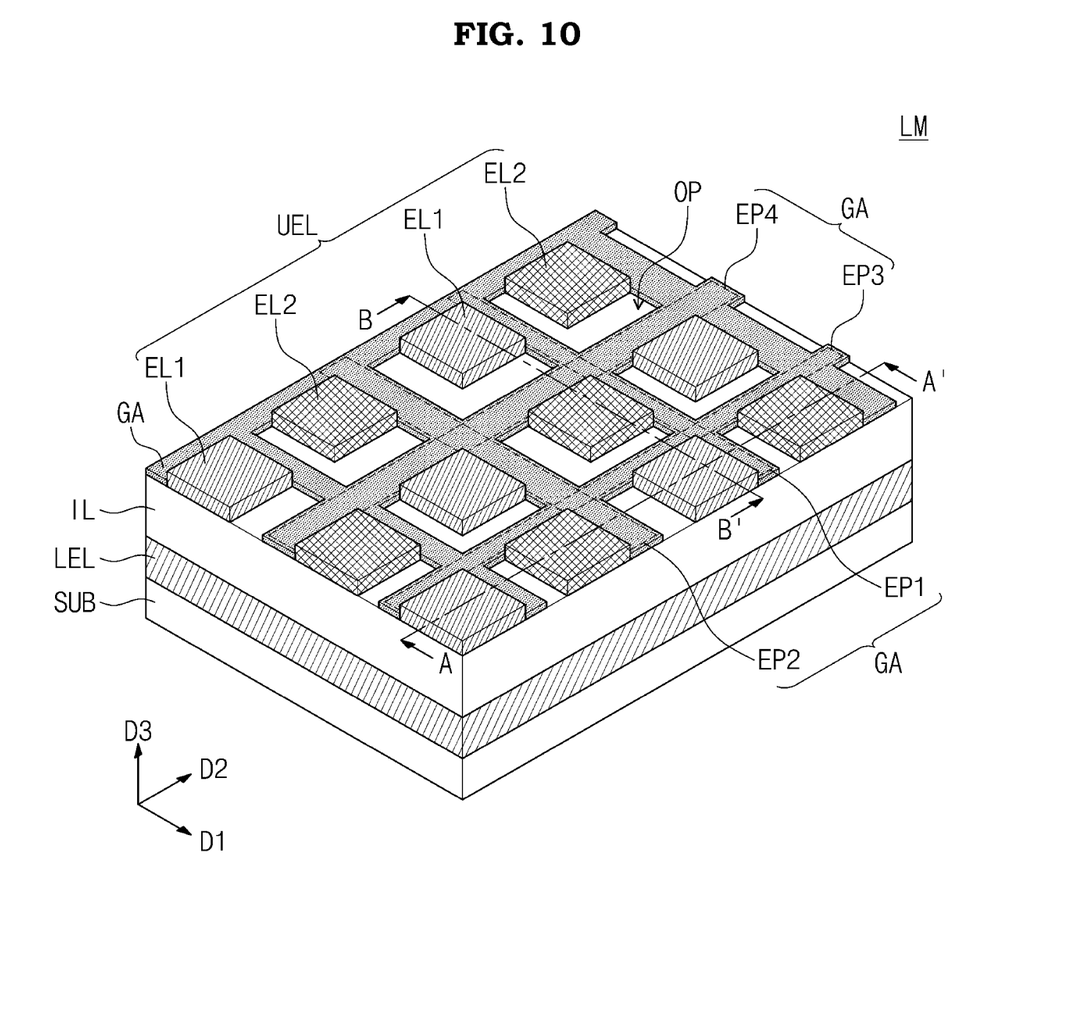
FIG. 10 is a perspective view illustrating an optical device according to example embodiments.
Figure 11A:
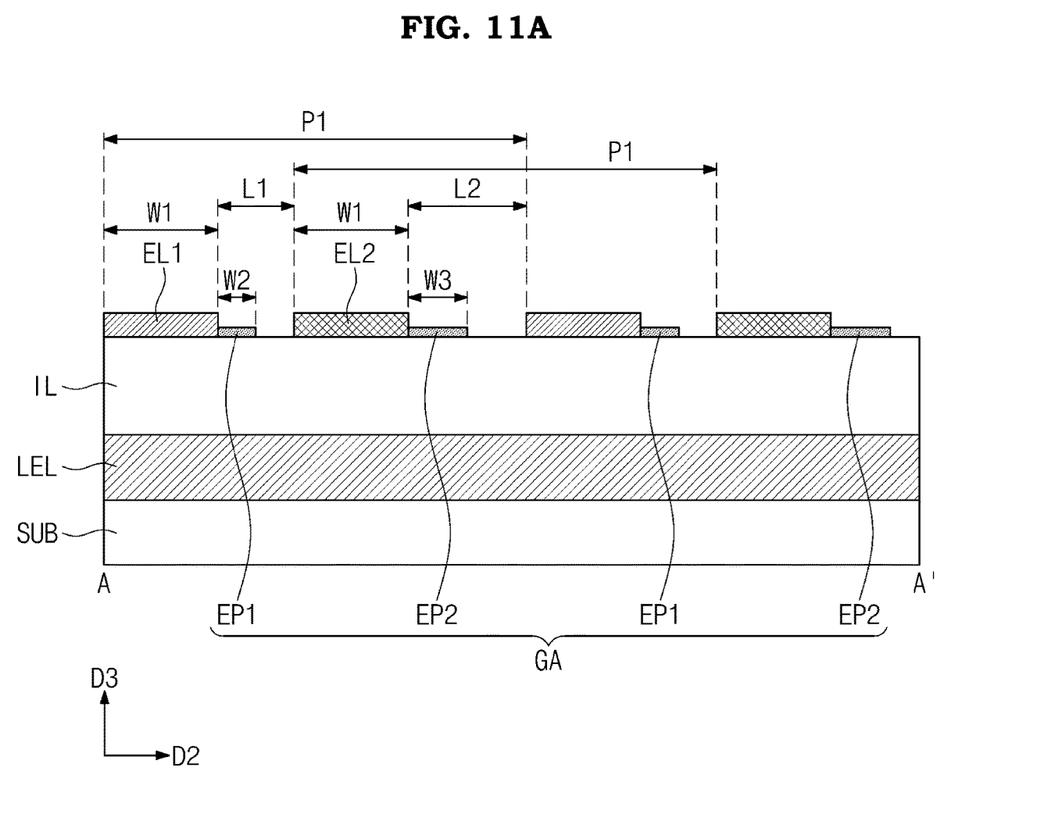
FIGS. 11A and 11B are cross-sectional views of the optical device cut along a line A-A' and a line B-B' of FIG. 10, respectively.
Figure 11B:
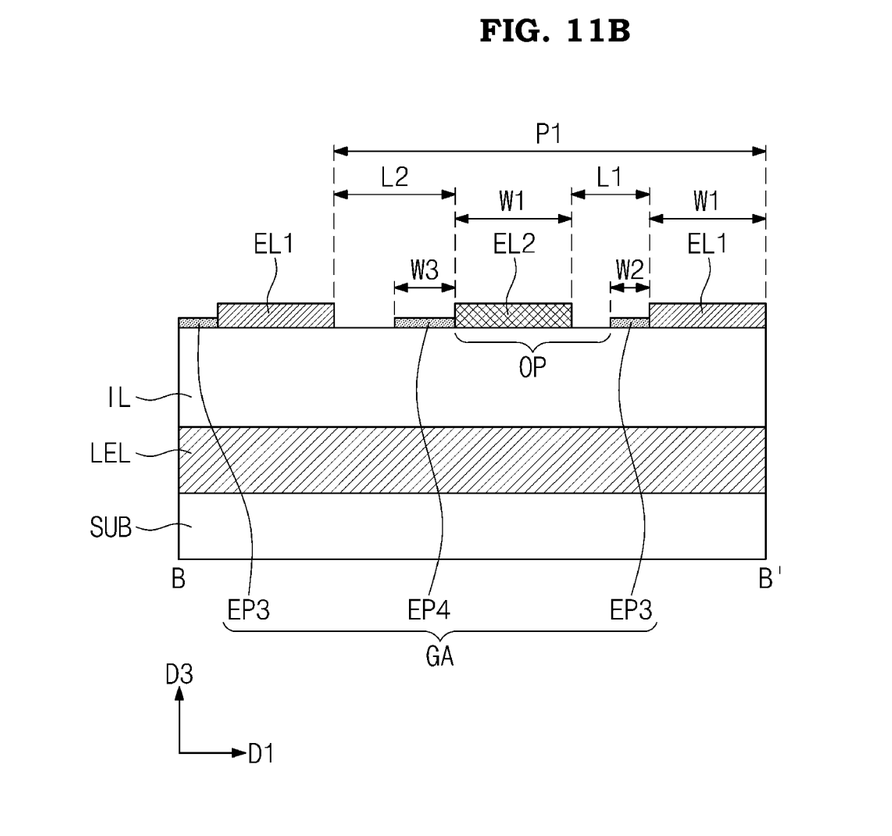

FIG. 10 is a perspective view illustrating an optical device according to example embodiments, and FIGS. 11A and 11B are cross-sectional views of the optical device cut along a line A-A' and a line B-B' of FIG. 10, respectively. Herein, further description related to technical features of the optical device described above with reference to FIGS. 1 and 2 is omitted and description is made based on a difference.

Referring to FIG. 10 and FIGS. 11A and 11B, upper electrodes UEL may be provided on an insulating layer IL.

The upper electrodes UEL may include first electrodes EL1 and second electrodes EL2. Each of the first and second electrodes EL1 and EL2 may be in a shape of a pad. In a plane view, each of the first and second electrodes EL1 and EL2 may be in a polygonal shape, for example, a rectangular shape.

The first and second electrodes EL1 and EL2 may be two-dimensionally provided on the insulating layer IL. The first and second electrodes EL1 and EL2 may be alternately provided in a second direction D2. Also, the first and second electrodes EL1 and EL2 may be alternately provided in a first direction D1.

For example, four second electrodes EL2 may be provided around a single first electrode EL1. The four second electrodes EL2 may be adjacent to the single first electrode EL1 in the first direction D1 and the second direction D2. Four first electrodes EL1 may be provided around a single second electrode EL2. The four first electrodes EL1 may be adjacent to the single second electrode EL2 in the first direction D1 and the second direction D2.

The first and second electrodes EL1 and EL2 may have a substantially identical size. The first and second electrodes EL1 and EL2 may be in a substantially identical flat shape.

The first electrodes EL1 may be aligned at intervals of a first pitch P1 in the first direction D1. The first electrodes EL1 may be aligned at intervals of the first pitch P1 in the second direction D2. The second electrodes EL2 may be aligned at intervals of the first pitch P1 in the first direction D1. The second electrodes EL2 may be aligned at intervals of the first pitch P1 in the second direction D2.

A variable conductivity pattern GA may be provided on the insulating layer IL. The variable conductivity pattern GA may be in a shape of a grid. In detail, the variable conductivity pattern GA may include first extending portions EP1 that extend in the first direction D1, second extending portions EP2 that extend in the first direction D1, third extending portions EP3 that extend in the second direction D2, and fourth extending portions EP4 that extend in the second direction D2.

The first and second extending portions EP1 and EP2 may be alternately aligned in the second direction D2. The third and fourth extending portions EP3 and EP4 may be alternately aligned in the first direction D1. Each of the first and third extending portions EP1 and EP3 may have a second width W2. Each of the second and fourth extending portions EP2 and EP4 may have a third width W3.

The first extending portion EP1, the second extending portion EP2, the third extending portion EP3, and the fourth extending portion EP4 may intersect and define a single opening OP. The first electrode EL1 or the second electrode EL2 may be provided within the opening OP.

Figure 12:
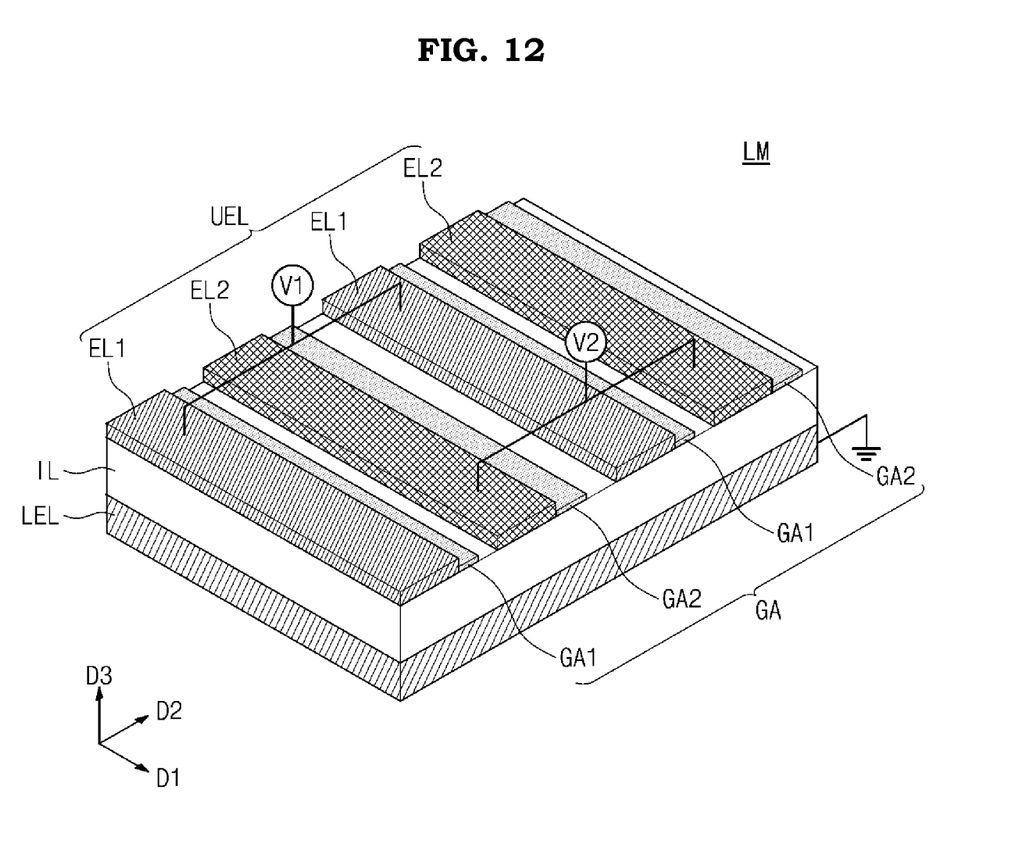
FIG. 12 is a perspective view illustrating an optical device according to example embodiments.

FIG. 12 is a perspective view illustrating an optical device according to example embodiments. Herein, further description related to technical features of the optical device described above with reference to FIGS. 1 and 2 is omitted and description is made based on a difference.

Herein, in a light modulator LM, a substrate SUB may be omitted from below the lower electrode LEL. For example, although not illustrated, a support body may be provided at each of both ends of the light modulator LM to support the light modulator LM. An active area of the light modulator LM of FIG. 12 may be provided to be suspended in the air.

The lower electrode LEL may be an electrode capable of transmitting a mid-infrared ray. For example, the lower electrode LEL may include transparent conducting oxide (TCO). The TCO may be selected from among indium tin oxide (ITO), F-doped tin oxide (FTO), zinc oxide (ZnO), titanium dioxide (TiO2), Ga-doped zinc oxide (GZO), Al-doped zinc oxide (AZO), and combination thereof. As another example, the lower electrode LEL may include doped silicon.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical device comprising:
   a lower electrode;
   an insulating layer provided on the lower electrode;
   upper electrodes provided on the insulating layer; and
   variable conductivity patterns provided to be adjacent to the upper electrodes, respectively, on the insulating layer, wherein a conductivity of the variable conductivity patterns is changed based on a voltage applied to the upper electrodes,
   wherein the variable conductivity pattern comprises graphene having at least one layer, and wherein the upper electrodes comprise first and second electrodes that are alternately provided, a pitch between the first electrodes is identical to a pitch between the second electrodes, the second electrode is provided between the adjacent first electrodes, a distance between one of the adjacent first electrodes and the second electrode is a first length, a distance between another one of the adjacent first electrodes and the second electrode is a second length, and the second length differs from the first length;
   wherein the variable conductivity patterns comprise first and second variable conductivity patterns provided to be adjacent to the first and second electrodes, respectively, wherein the first and second electrodes have an identical first width, each of the first variable conductivity patterns has a second width, and each of the second variable conductivity patterns has a third width different from the second width,
   wherein the third width is greater than the second width,
   wherein the second width is half of the first length and the third width is half of the second length,
   wherein the first variable conductivity patterns are coupled to the first electrodes and the second variable conductivity patterns are coupled to the second electrodes, and
   wherein, when a first voltage is applied to the first electrodes and a second voltage different from the first voltage is applied to the second electrodes, different fermi energies are provided to the first variable conductivity patterns and the second variable conductivity patterns, respectively, so that the conductivity of the first variable conductivity patterns and the conductivity of the second variable conductivity patterns are different from one another.

2. The optical device of claim 1, wherein each of the first variable conductivity patterns is in direct contact with one side of the first electrode, and each of the second variable conductivity patterns is in direct contact with the second electrode.

3. The optical device of claim 2, wherein each of the first variable conductivity patterns is separate from the second electrode adjacent thereto, and each of the second variable conductivity patterns is separate from the first electrode adjacent thereto.

4. The optical device of claim 1, wherein each of the first variable conductivity patterns is separate from all of the first electrode and the second electrode adjacent thereto, and each of the second variable conductivity patterns is separate from all of the first electrode and the second electrode adjacent thereto.

5. The optical device of claim 1, wherein the lower electrode is in a shape of a flat plate.

6. The optical device of claim 1, wherein the upper electrodes are in a shape of a line that extends in a first direction, and the variable conductivity patterns extend in the first direction along the upper electrodes.

7. The optical device of claim 1, wherein the first voltage is commonly applied to the first electrodes, and the second voltage is commonly applied to the second electrodes.

8. An optical device comprising:
   a lower electrode;
   an insulating layer provided on the lower electrode;
   upper electrodes provided on the insulating layer;
   variable conductivity patterns provided to be adjacent to the upper electrodes, respectively, on the insulating layer, wherein a conductivity of the variable conductivity patterns is changed based on a voltage applied to the upper electrodes,
   wherein the variable conductivity pattern comprises graphene having at least one layer, and wherein the upper electrodes comprise first and second electrodes that are alternately provided, the variable conductivity patterns comprise first and second variable conductivity patterns that are provided to be adjacent to the first and second electrodes, respectively, the first and second electrodes have an identical first width, each of the first variable conductivity patterns has a second width,
   each of the second variable conductivity patterns has a third width different from the second width; and wherein the third width is greater than the second width,
   wherein the first and second electrodes are alternately provided, a second electrode of the second electrodes is provided between the adjacent first electrodes, a distance between one first electrode of the adjacent first electrodes and the second electrode of the second electrodes is a first length, a distance between another first electrode of the adjacent first electrodes and the second electrode of the second electrodes is a second length, and the second length differs from the first length,
   wherein the second width is half of the first length and the third width is half of the second length,
   wherein the first variable conductivity patterns are coupled to the first electrodes and the second variable conductivity patterns are coupled to the second electrodes, and
   wherein when a first voltage is applied to the first electrodes and a second voltage different from the first voltage is applied to the second electrodes, different fermi energies are provided to the first variable conductivity patterns and the second variable conductivity patterns, respectively, so that the conductivity of the first variable conductivity patterns and the conductivity of the second variable conductivity patterns are different from one another.

9. The optical device of claim 8, wherein the first and second electrodes adjacent to each other are separate from each other at a first length based on the first variable conductivity pattern, the first and second electrodes adjacent to each other are separate from each other at a second length based on the second variable conductivity pattern, and the first length and the second length differ from each other.

10. The optical device of claim 8, wherein a pitch between the first electrodes is identical to a pitch between the second electrodes.

11. The optical device of claim 8, wherein the upper electrodes are in a shape of a line that extends in a first direction, and the variable conductivity patterns extend in the first direction along the upper electrodes.

12. The optical device of claim 11, wherein the first and second electrodes are alternately provided in a second direction that intersects the first direction.

* * * * *